US012220753B2

(12) United States Patent
Ogawa

(10) Patent No.: US 12,220,753 B2
(45) Date of Patent: Feb. 11, 2025

(54) ROTARY TOOL AND METHOD FOR MANUFACTURING MACHINED PRODUCT

(71) Applicant: KYOCERA Corporation, Kyoto (JP)

(72) Inventor: Hiroshi Ogawa, Omihachiman (JP)

(73) Assignee: KYOCERA CORPORATION, Kyoto (JP)

(*) Notice: Subject to any disclaimer, the term of this patent is extended or adjusted under 35 U.S.C. 154(b) by 771 days.

(21) Appl. No.: 17/416,516

(22) PCT Filed: Dec. 24, 2019

(86) PCT No.: PCT/JP2019/050510
§ 371 (c)(1),
(2) Date: Jun. 21, 2021

(87) PCT Pub. No.: WO2020/138033
PCT Pub. Date: Jul. 2, 2020

(65) Prior Publication Data
US 2022/0080516 A1  Mar. 17, 2022

(30) Foreign Application Priority Data
Dec. 25, 2018  (JP) .................. 2018-240811

(51) Int. Cl.
B23B 51/06 (2006.01)
B23C 5/10 (2006.01)
B23C 5/28 (2006.01)

(52) U.S. Cl.
CPC ............... *B23B 51/06* (2013.01); *B23C 5/10* (2013.01); *B23B 2250/12* (2013.01); *B23C 5/28* (2013.01)

(58) Field of Classification Search
CPC ..... B23B 51/06; B23B 51/063; B23B 51/066; B23B 51/068; B23B 51/0686; B23B 2250/12; B23C 5/28; B23C 5/281; B23C 5/282; B23C 5/287
See application file for complete search history.

(56) References Cited

U.S. PATENT DOCUMENTS 960,526 A  *  6/1910  Erlandsen ............... B23B 27/10
                                                    407/50
3,037,264 A  *  6/1962  Mossberg ................. B23C 5/10
                                                    407/53
(Continued)

FOREIGN PATENT DOCUMENTS

| AT | 001324 U1 | 3/1997 |
| JP | 2005262330 A | 9/2005 |
| JP | 200978330 A | 4/2009 |

*Primary Examiner* — Nicole N Ramos
(74) *Attorney, Agent, or Firm* — HAUPTMAN HAM, LLP

(57) ABSTRACT

A rotary tool may include a base extended along a rotation axis from a first end toward a second end. The base may include a cutting part and a flow path located inside the base. The cutting part may include a first flute and a first ridgeline. The first flute may be spirally extended from the first cutting edge. The first ridgeline may be a ridgeline formed by the first flute and an outer peripheral surface adjacent to the first flute on a rear side in a rotation direction. The flow path may include a first sub flow path extended from a main flow path toward a side of the second end. A first angle formed by the rotation axis and the first sub flow path may be smaller than a helix angle formed by the rotation axis and the first ridgeline.

13 Claims, 17 Drawing Sheets

(56) References Cited

U.S. PATENT DOCUMENTS

| | | | | |
|---|---|---|---|---|
| 5,174,692 A | * | 12/1992 | Martin | B23B 51/10 |
| | | | | 408/59 |
| 5,382,121 A | * | 1/1995 | Bicknell | E21B 10/445 |
| | | | | 175/323 |
| 6,045,301 A | * | 4/2000 | Kammermeier | B23B 51/06 |
| | | | | 408/230 |
| 6,439,811 B1 | * | 8/2002 | Wardell | B23C 5/10 |
| | | | | 407/56 |
| 2003/0118411 A1 | | 6/2003 | Flynn et al. | |
| 2015/0104265 A1 | * | 4/2015 | Itoh | B23B 51/02 |
| | | | | 408/230 |
| 2016/0263666 A1 | * | 9/2016 | Myers | B23C 5/28 |
| 2016/0361769 A1 | * | 12/2016 | Guter | B23B 51/02 |
| 2018/0133809 A1 | * | 5/2018 | Brunner | B23Q 11/1023 |
| 2018/0272442 A1 | * | 9/2018 | Jäger | B23B 51/06 |
| 2019/0134723 A1 | * | 5/2019 | Mueller | B23P 15/34 |
| 2019/0224761 A1 | * | 7/2019 | Amaya | B23B 51/02 |

* cited by examiner

ROTARY TOOL AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2019/050510 filed on Dec. 24, 2019, which claims priority to Japanese Application No. 2018-240811 filed on Dec. 25, 2018, which are entirely incorporated herein by reference.

TECHNICAL FIELD

The present disclosure may relate to a rotary tool and a method for manufacturing a machined product.

BACKGROUND

A rotary tool may be discussed in Japanese Unexamined Patent Publication No. 2009-78330 (Patent Document 1). Chip discharge performance may be enhanced by passing a coolant from a side of a front end toward a side of a rear end.

An angle formed by a branch flow path connecting to a rear ejection hole and a rotation axis may be larger than a helix angle of a flute in the rotary drilling tool (rotary tool) discussed in Patent Document 1. Therefore, if an amount of cutting is increased by increasing the helix angle, the coolant may flow in a direction away from the rotation axis, so that chips may be less likely to be discharged toward the side of the rear end.

SUMMARY

A rotary tool in a non-limiting embodiment of the present disclosure may include a base which has a bar shape and is extended along a rotation axis from a first end toward a second end. The base may include a cutting part, a shank part and a flow path. The cutting part may be located so as to include the first end. The shank part may be located closer to a side of the second end than the cutting part. The flow path may be located inside the base and may be extended along the rotation axis. The cutting part may include an outer peripheral surface, a first cutting edge, a first flute and a first ridgeline. The first cutting edge may be lodated from the first end toward the outer peripheral surface. The first flute may be spirally extended from the first cutting edge toward a side of the second end. The first ridgeline may be formed by the first flute and the outer peripheral surface adjacent to the first flute on a rear side in a rotation direction of the rotation axis. The flow path may include a main flow path extended from a side of the second end toward a side of the first end, and a first sub flow path extended from the main flow path toward a side of the second end. The first sub flow path may include a first opening that opens into the first flute. A first angle formed by the rotation axis and the first sub flow path may be smaller than a helix angle formed by the rotation axis and the first ridgeline.

A method for manufacturing a machined product in a non-limiting embodiment of the present disclosure may include rotating the rotary tool in the above embodiment, bringing the rotary tool being rotated into contact with a workpiece, and moving the rotary tool away from the workpiece.

BRIEF DESCRIPTION OF THE DRAWINGS

FIG. 1 is a perspective view which illustrates a rotary tool in a non-limiting embodiment of the present disclosure, and which illustrates a state where a flow path and the like are seen through;

EMBODIMENTS

<Rotary Tools>

Figure 1:
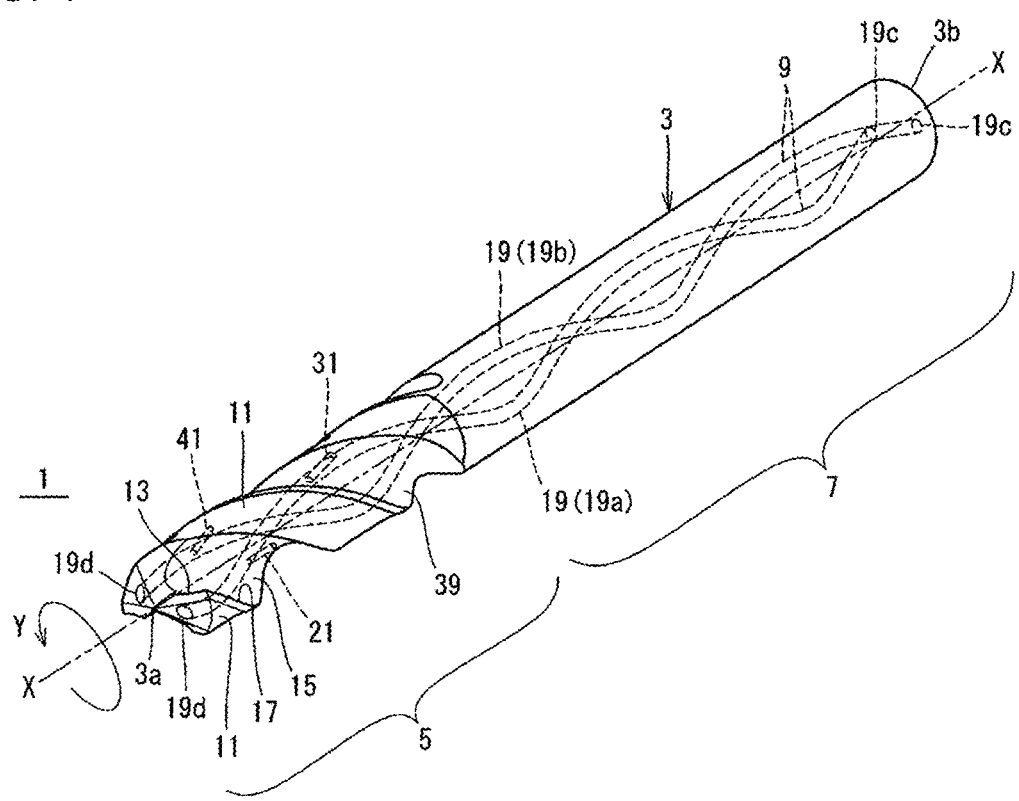

Rotary tools in non-limiting embodiments of the present disclosure may be described in detail with reference to the drawings. Specifically, a drill may be described in detail with reference to the drawings as a non-limiting embodiment of the rotary tools. Examples of the rotary tools may include, besides the drills, end mills and reamers. Hence, the drill described in the following may be replaced with the rotary tool, such as the end mill.

For the sake of description, the drawings referred to in the following may illustrate, in simplified form, only main members among members constituting the non-limiting embodiments. The rotary tools may therefore be capable of including any arbitrary structural member not illustrated in the drawings referred to in the present specification. Dimensions of the members in each of the drawings may faithfully represent neither dimensions of actual structural members nor dimensional ratios of these members. These points may also be true for a method for manufacturing a machined product described later.

The rotary tool 1 in a non-limiting embodiment illustrated in FIG. 1 may be a drill, and may include a base 3 which has a bar shape extended along a rotation axis X from a first end 3a toward a second end 3b. The base 3 having the bar shape may be rotatable in a direction of an arrow Y around the rotation axis X as in the non-limiting embodiment illustrated in FIG. 1 in a cutting process of a workpiece for the purpose of manufacturing a machined product.

A lower left end of the base 3 may be the first end 3a, and an upper right end may be the second end 3b in the non-limiting embodiment illustrated in FIG. 1. An upper end part of the base 3 may be the first end 3a, and a lower end part thereof may be the second end 3b in non-limiting embodiments illustrated in FIGS. 2 to 6. In general, the first end 3a may also be called a front end, and the second end 3b may also be called a rear end.

Figure 2:
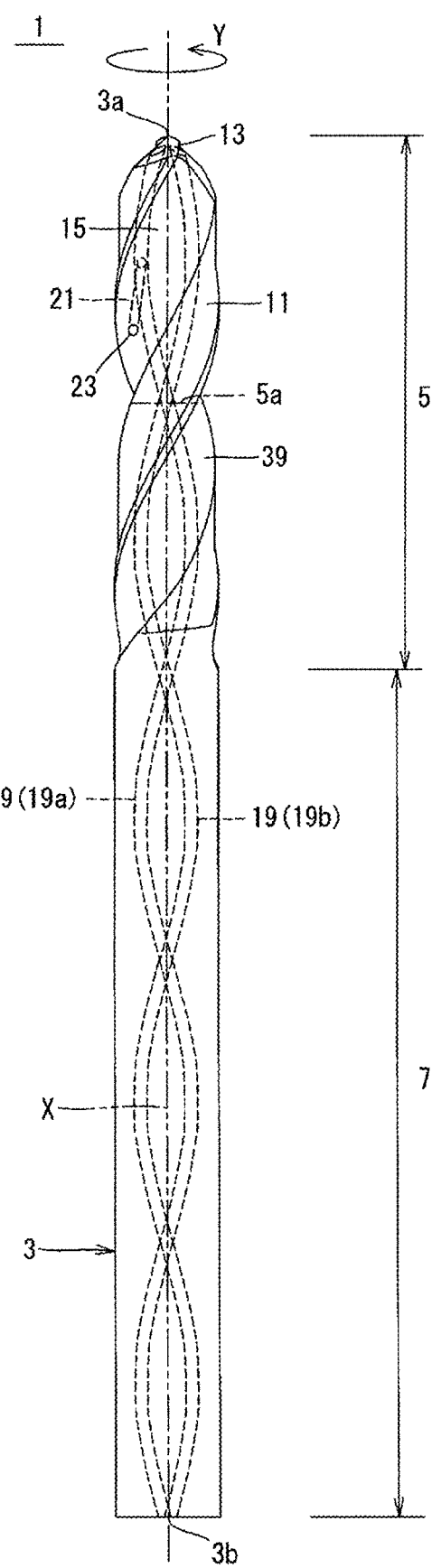
FIG. 2 is a side view of the rotary tool illustrated in FIG. 1.
Figure 3:
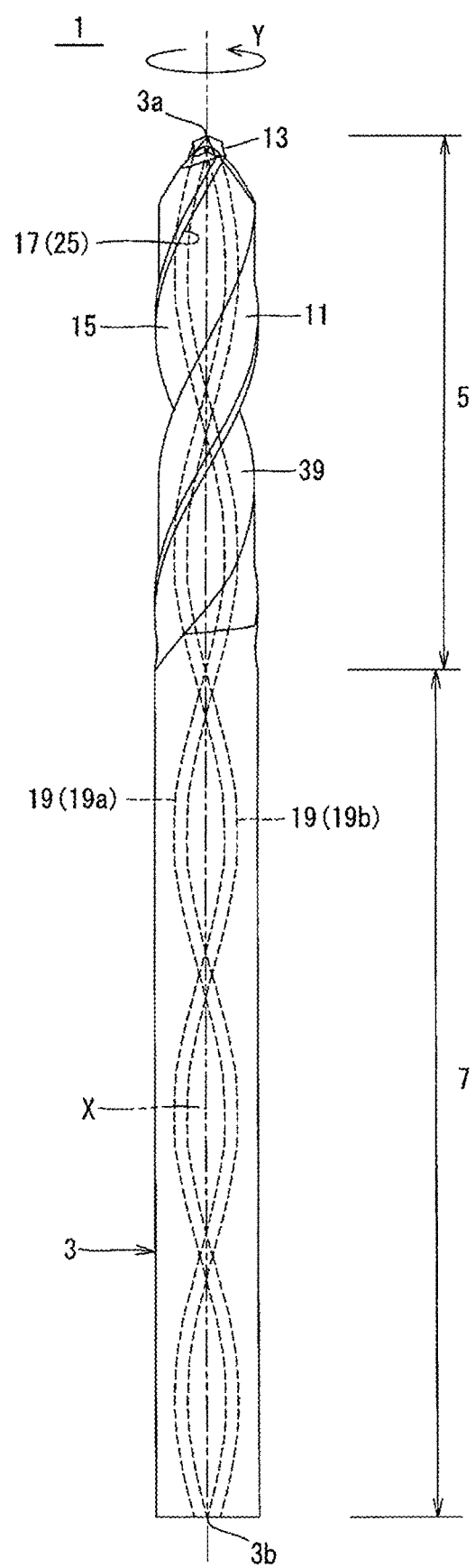
FIG. 3 is a side view of the rotary tool illustrated in FIG. 1.
Figure 4:
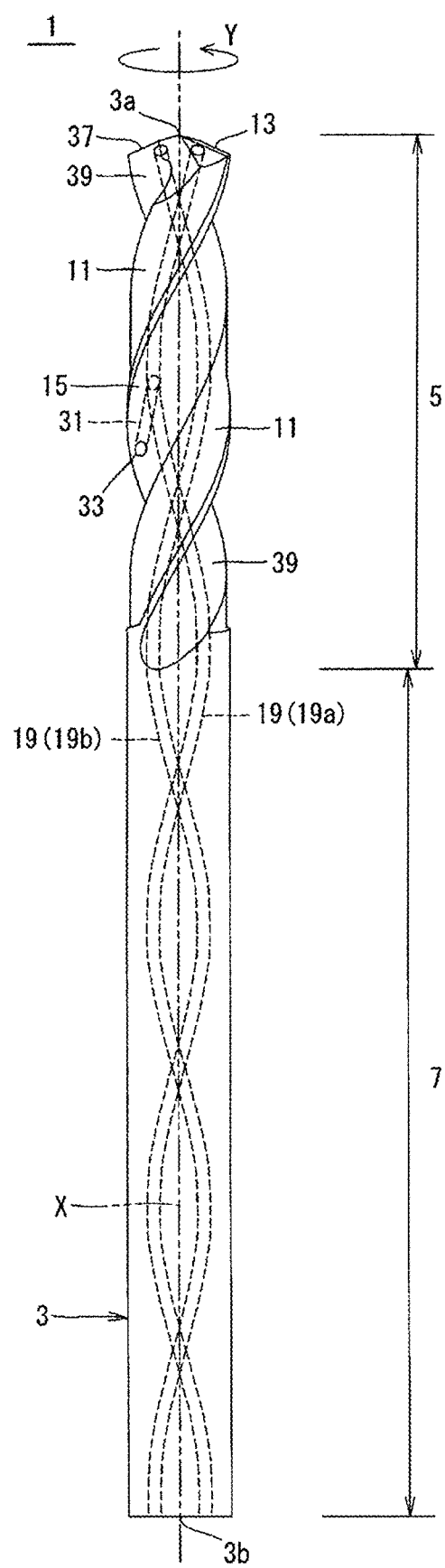
FIG. 4 is a side view of the rotary tool illustrated in FIG. 1.
Figure 5:
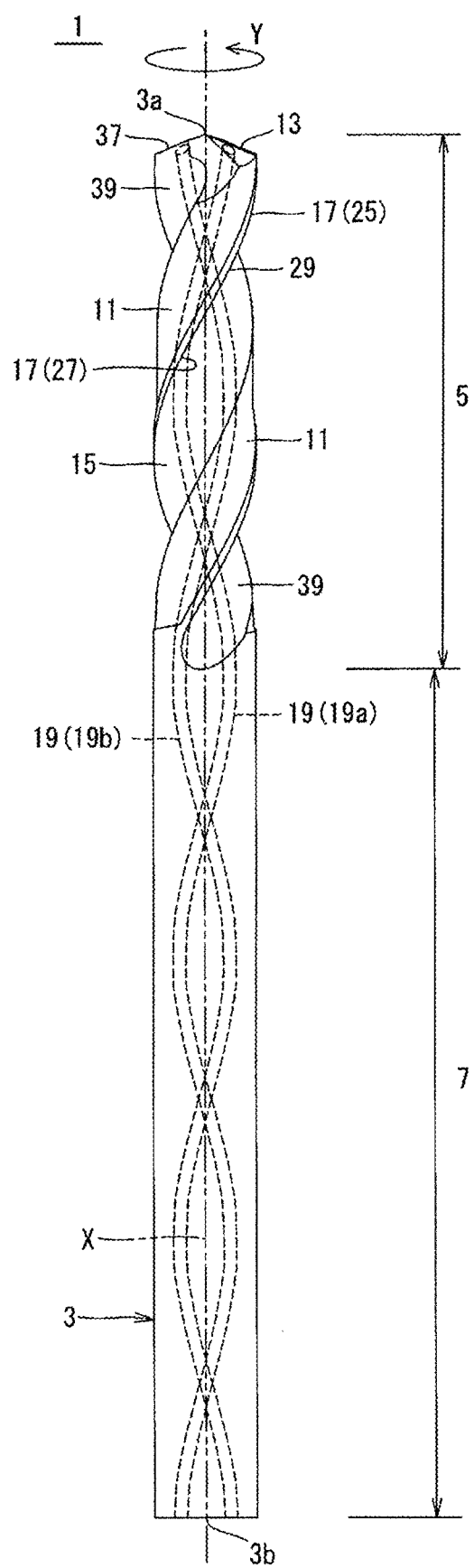
FIG. 5 is a side view of the rotary tool illustrated in FIG. 1.
Figure 6:
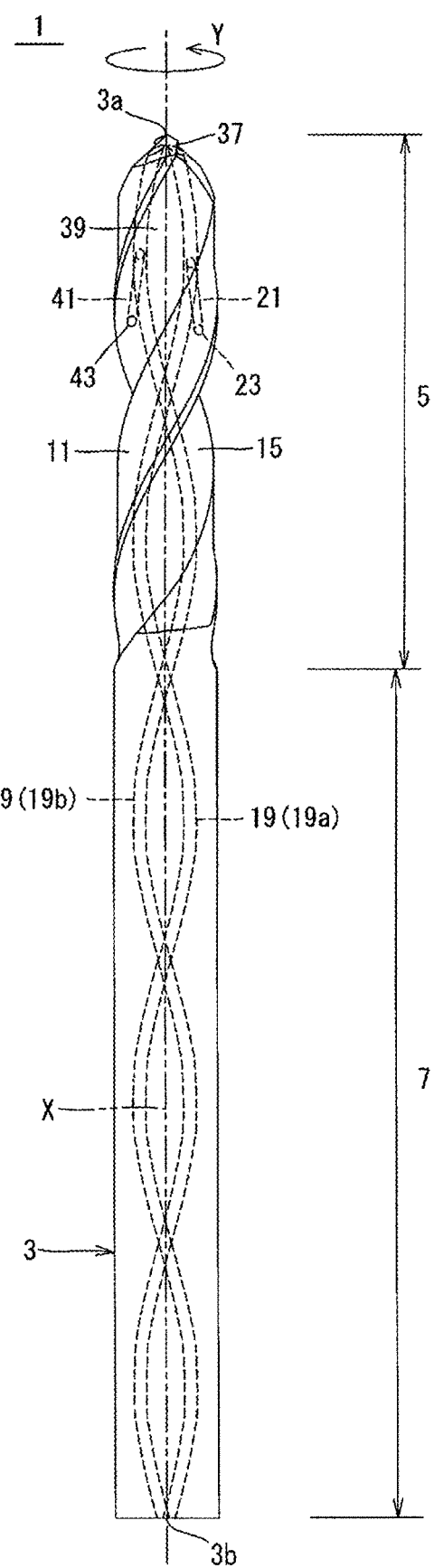
FIG. 6 is a side view of the rotary tool illustrated in FIG. 1.

FIGS. 3 to 6 may illustrate a state where the rotary tool illustrated in FIG. 2 is rotated by a predetermined angle in a rotation direction. Specifically, FIG. 3 may illustrate a state where the rotary tool illustrated in FIG. 2 is rotated by 10 degrees in the rotation direction. FIG. 4 may illustrate a state where the rotary tool illustrated in FIG. 2 is rotated by 70 degrees in the rotation direction. FIG. 5 may illustrate a state where the rotary tool illustrated in FIG. 2 is rotated by 90 degrees in the rotation direction. FIG. 6 may illustrate a state where the rotary tool illustrated in FIG. 2 is rotated by 180 degrees in the rotation direction.

The base 3 in the non-limiting embodiment illustrated in FIG. 1 may have a columnar shape. The term "columnar shape" may be a concept including not only a strict circular column but also those having a slight concave-convex or curved surface. The shape of the base 3 is not be limited to the columnar shape.

An outer diameter D in the base 3 may be settable to, for example, 4-25 mm. A relationship between L and D may be settable to, for example, L=4D to 15D, in which L is a length of the base 3 in a direction along the rotation axis X.

The base 3 may include a cutting part 5 located so as to include the first end 3a, and a shank part 7 located on a side closer to the second end 3b than the cutting part 5 in the non-limiting embodiment illustrated in FIGS. 1 to 6. The cutting part 5 may include a portion brought into contact with a workpiece. The portion may perform a major role in a cutting process of the workpiece. The shank part 7 may be a part which is held by, for example, a spindle to be rotated in a machine tool, and which is designed according to a shape of the spindle. Examples of the shape of the shank part 7 may include straight shank, long shank, long neck and tapered shank.

The cutting part 5 may include an outer peripheral surface 11, a first cutting edge 13, a first flute 15 and a first ridgeline 17 in the non-limiting embodiment illustrated in FIG. 1.

The outer peripheral surface 11 may be a surface located on an outer periphery of the cutting part 5. FIGS. 1 to 6 may illustrate non-limiting embodiments in which a distance from the rotation axis X to the outer peripheral surface 11 is approximately kept constant.

The first cutting edge 13 may be located from the first end 3a toward the outer peripheral surface 11 in the non-limiting embodiment illustrated in FIG. 1. The first cutting edge 13 may generally also be called a tip edge. The first cutting edge 13 may perform a major role in chip generation during the cutting process. These points may also be true for a second cutting edge 37 described later.

The first flute 15 may be spirally extended from the first cutting edge 13 toward a side of the second end 3b in the non-limiting embodiment illustrated in FIG. 1. The first flute 15 may be a flute for discharging the chips generated by the first cutting edge 13 during cutting of the workpiece. The first flute 15 may therefore also be called a chip discharge flute. These points may also be true for a second flute 39 described later.

In the non-limiting embodiment illustrated in FIG. 1, the first flute 15 may be spirally extended around the rotation axis X so as to extend to a side opposite to the rotation direction Y as going from the first cutting edge 13 toward the second end 3b. The term "spirally extending" may denote that the first flute 15 extends approximately twistingly as going from the first cutting edge 13 toward the side of the second end 3b. Therefore, the first flute 15 may include a partially untwisted part. These points may also be true for the second flute 39 described later.

In the non-limiting embodiment illustrated in FIG. 1, the first ridgeline 17 may be a ridgeline formed by the first flute 15 and the outer peripheral surface 11 adjacent to the first flute 15 on a rear side in the rotation direction Y of the rotation axis X.

The base 3 may further include a flow path 9 which is located inside the base 3 and is extended along the rotation axis X in the non-limiting embodiment illustrated in FIG. 1. The flow path 9 may be a part that permits passage of fluid therethrough.

The fluid passing through the flow path 9 may generally be called a coolant. Examples of the coolant may include water-insoluble cutting fluids, water-soluble cutting fluids and compressed air. Examples of the water-insoluble cutting fluids may include cutting fluids represented by oil-based cutting fluids, inert extreme pressure-based cutting fluids and active extreme pressure-based cutting fluids. Examples of the water-soluble cutting fluids may include emulsion-type, soluble-type and solution-type cutting fluids. The coolant may be used by suitably selecting according to a material of the workpiece.

Examples of shape of the flow path 9 may include straight line shape and curvilinear shape. Examples of the curvilinear shapes may include spiral shapes. The shape of the flow path 9 is not particularly limited as long as it permits passage of the fluid. This may also be true for a sectional shape of the flow path 9. A cross-section of the flow path 9 orthogonal to a flow direction of the fluid may have, for example, a circular shape, an elliptical shape or a polygonal shape.

The flow path 9 may include a main flow path 19 and a first sub flow path 21 in the non-limiting embodiment illustrated in FIG. 1.

The main flow path 19 may be extended from a side of the second end 3b toward a side of the first end 3a in the non-limiting embodiment illustrated in FIG. 1. The main flow path 19 may have a spiral shape in the non-limiting embodiment illustrated in FIG. 1. In other words, the main flow path 19 may be spirally extended from the side of the second end 3b toward the side of the first end 3a in the non-limiting embodiment illustrated in FIG. 1. The shape of the main flow path 19 is not limited to the spiral shape. For example, the main flow path 19 may have a straight line shape. An inner diameter of the main flow path 19 may be settable to, for example, 0.5-3 mm.

One or a plurality of the main flow paths 19 may be included. In the case of the plurality of the main flow paths 19, these main flow paths 19 may have the same or different configurations. The two main flow paths 9 may be included as in the non-limiting embodiment illustrated in FIG. 1. In other words, the flow path 9 may include a first main flow path 19a and a second main flow path 19b as in the non-limiting embodiment illustrated in FIG. 1. The first main flow path 19a and the second main flow path 19b may have the same configuration as in the non-limiting embodiment illustrated in FIG. 1.

The main flow path 19 may include an inflow port 19c and an outflow port 19d in the non-limiting embodiment illustrated in FIG. 1.

The inflow port 19c may be a part that permits inflow of an outwardly supplied fluid into the main flow path 19. The inflow port 19c may be located on an end surface at the second end 3b in the non-limiting embodiment illustrated in FIG. 1. A position of the inflow port 19c is not limited to the end surface at the second end 3b. For example, the inflow port 19c may be located on an outer peripheral surface of the shank part 7. One or a plurality of the inflow ports 19c may be included.

The outflow port 19d may be a part that permits discharge of the fluid. The outflow port 19d may be located at an end surface on the side of the first end 3a so that the fluid can be ejected toward a direction away from the base 3 in the non-limiting embodiment illustrated in FIG. 1. A position of the outflow port 19d is not limited to the end surface on the side of the first end 3a. One or a plurality of the outflow ports 19d may be included.

The main flow path 19 may not include the outflow port 19d. Specifically, a first sub flow path 21 described later may be extended from the main flow path 19, and the fluid may be discharged from a first opening 23 of the first sub flow path 21 as in the non-limiting embodiment illustrated in FIG. 2. In this case, for example, the main flow path 19 may not include the outflow port 19d.

The first sub flow path 21 may be extended from the main flow path 19 toward a side of the second end 3b in the non-limiting embodiment illustrated in FIG. 2. The first sub flow path 21 may include a first opening 23 that opens into the first flute 15. The first sub flow path 21 may be a part which connects to the main flow path 19 and permits discharge of the fluid from the first opening 23 toward the side of the second end 3b. The first opening 23 may correspond to an edge of the first sub flow path 21 which opens into the first flute 15. These points may also be true for a second sub flow path 31 and a third sub flow path 41 described later.

The first sub flow path 21 may have a straight line shape and may be extended from the first main flow path 19a toward the side of the second end 3b. Alternatively, the first sub flow path 21 may be extended from the second main flow path 19b toward the side of the second end 3b.

Figure 8:
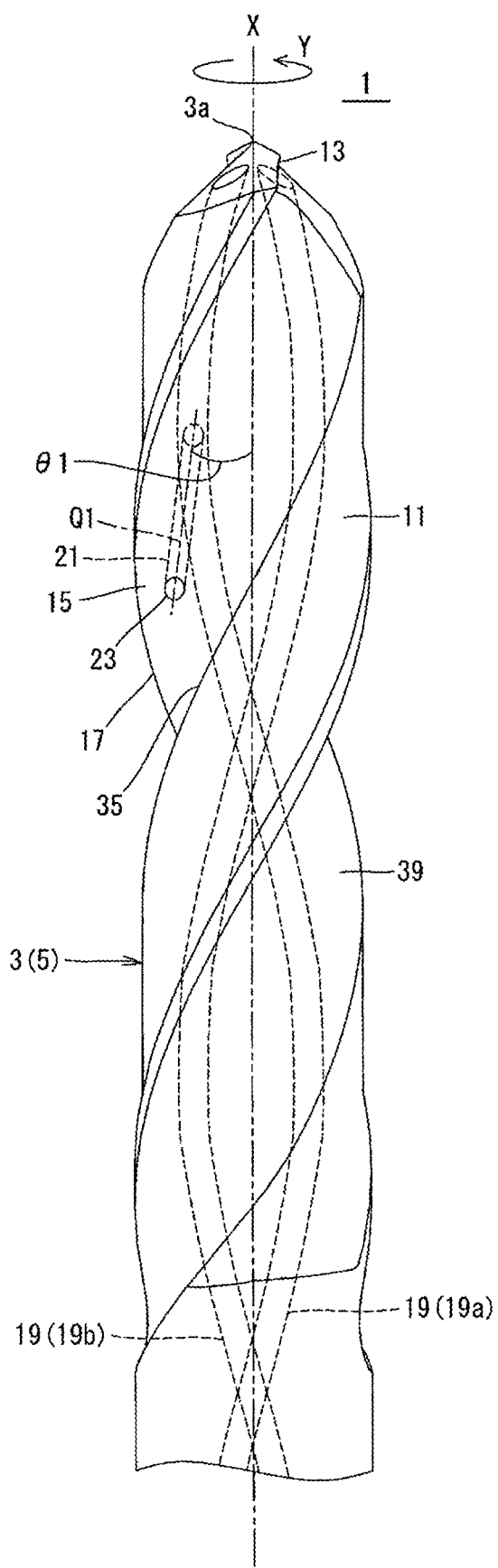
FIG. 8 is an enlarged view of surroundings of the first end of the rotary tool illustrated in FIG. 2.
Figure 9:
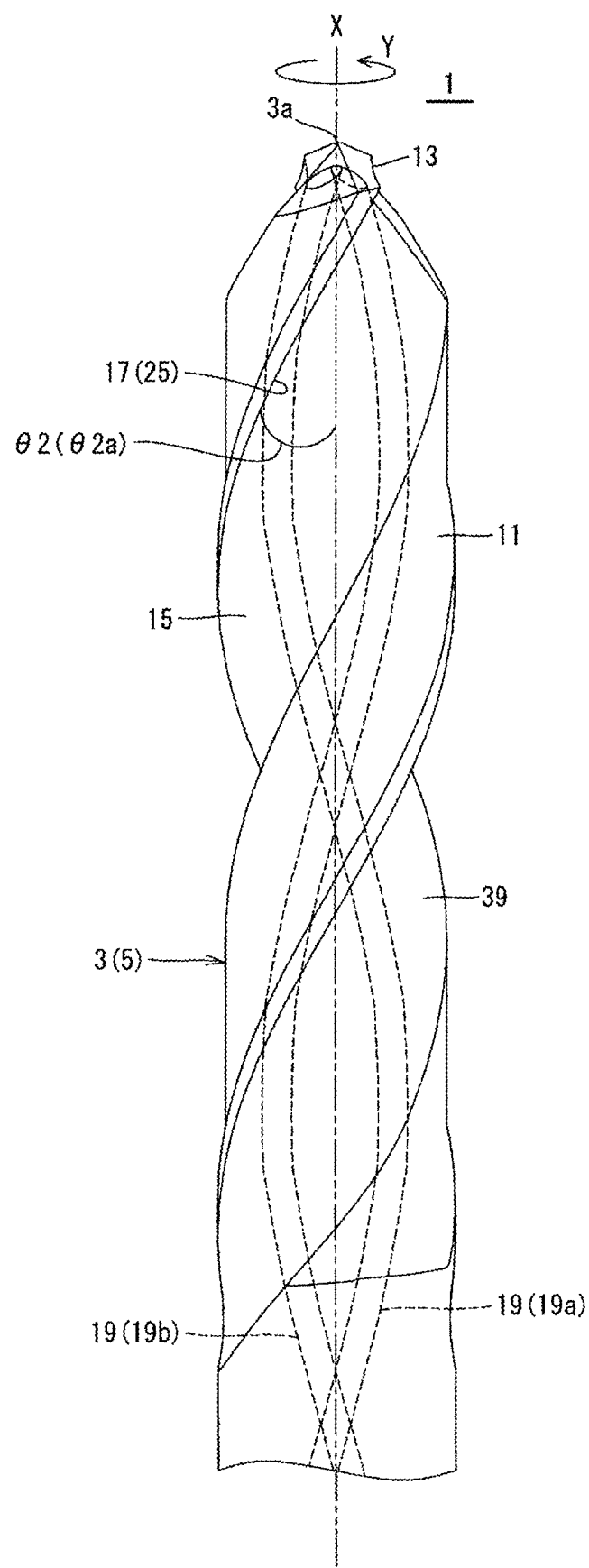
FIG. 9 is an enlarged view of surroundings of the first end of the rotary tool illustrated in FIG. 3.
Figure 11:
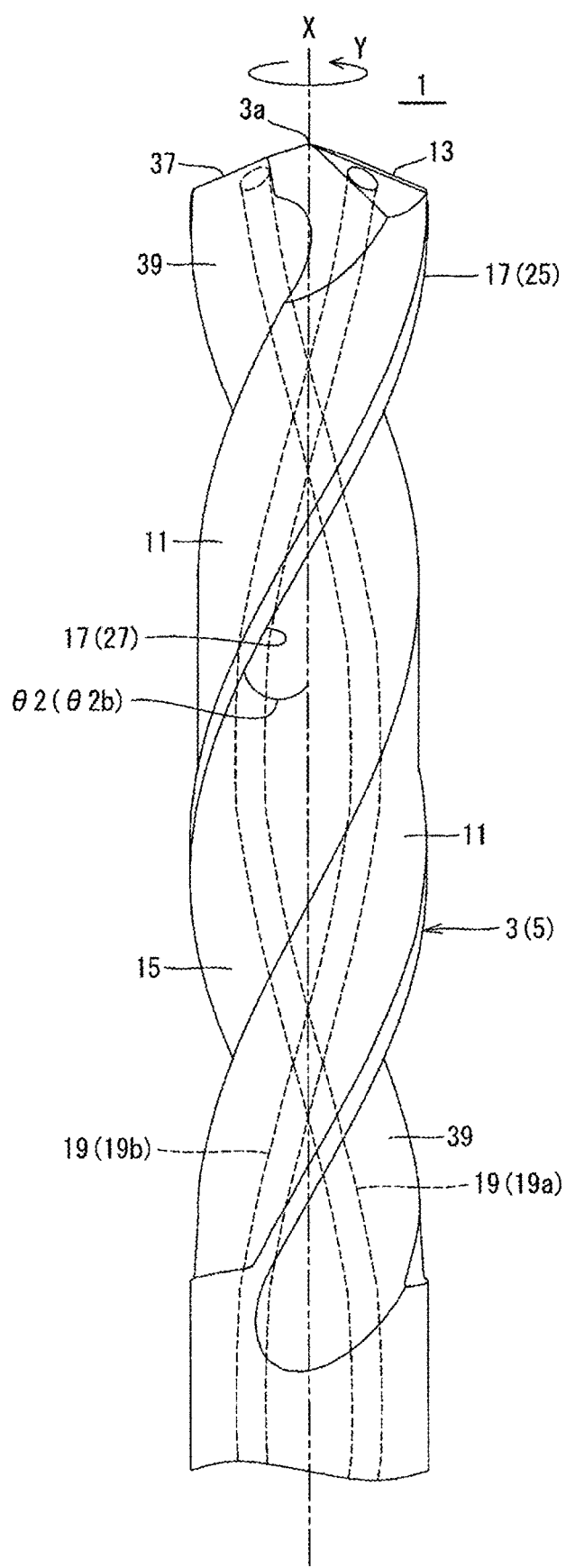
FIG. 11 is an enlarged view of surroundings of the first end of the rotary tool illustrated in FIG. 5.

A first angle $\theta 1$ formed by the rotation axis X and the first sub flow path 21 may be smaller than a helix angle $\theta 2$ formed by the rotation axis X and the first ridgeline 17 in a non-limiting embodiment illustrated in FIGS. 8, 9 and 11. With this configuration, even if the helix angle $\theta 2$ is increased to increase the amount of cutting, the fluid discharged from the first opening 23 toward the side of the second end 3b may tend to flow in a direction approaching the rotation axis X. Hence, chips generated by the first cutting edge 13 during the cutting process may tend to flow toward the side of the second end 3b by the fluid ejected from the first opening 23. The rotary tool 1 may therefore have excellent discharge performance. The rotary tool 1 may also have good cutting performance because the helix angle $\theta 2$ can be increased to increase the amount of cutting.

As to the first angle $\theta 1$ and the helix angle $\theta 2$, $\theta 1$ and $\theta 2$, each being a value of the angle, may be indicated by an absolute value. Specifically, a magnitude relationship between the first angle $\theta 1$ and the helix angle $\theta 2$ may be indicated by $|\theta 2|>|\theta 1|$.

The first angle $\theta 1$ may be evaluated in a state where an angle formed by the rotation axis X and a central axis Q1 of the first sub flow path 21 becomes maximum if the cutting part 5 is viewed from a direction orthogonal to the rotation axis X, as in the non-limiting embodiment illustrated in FIG. 8. The central axis Q1 of the first sub flow path 21 may be obtainable by a continuous existence of the center of the first inner diameter of the first sub flow path 21. The first angle $\theta 1$ may be settable to, for example, −20 to 25 degrees.

The helix angle $\theta 2$ may be evaluated by an angle formed by the rotation axis X and the first ridgeline 17 if the cutting part 5 is viewed from the direction orthogonal to the rotation axis X, as in the non-limiting embodiment illustrated in FIGS. 9 and 11. Alternatively, the helix angle $\theta 2$ may be evaluated using, instead of the rotation axis X, an imaginary straight line which passes through one point on the first ridgeline 17 and is parallel to the rotation axis X. The helix angle $\theta 2$ may be settable to, for example, −5 degrees to 40 degrees.

The first opening 23 may be located closer to the first end 3a than a center 5a of the cutting part 5 in a direction along the rotation axis X as in the non-limiting embodiment illustrated in FIG. 2. If satisfying the above configuration, the first opening 23 may be located in the vicinity of the first cutting edge 13, so that the chips generated by the first cutting edge 13 during the cutting process may tend to flow to the side of the second end 3b by the fluid ejected from the first opening 23, thus leading to enhanced chip discharge performance.

The first ridgeline 17 may include a first portion 25 and a second portion 27 located closer to the side of the second end 3b than the first portion 25 as in the non-limiting embodiment illustrated in FIGS. 3 and 5. A first helix angle $\theta 2a$ formed by the rotation axis X and the first portion 25 may be different from a second helix angle $\theta 2b$ formed by the rotation axis X and the second portion 27 as in the non-limiting embodiment illustrated in FIGS. 9 and 11. If satisfying these configurations, it may be possible to achieve both an increased amount of cutting and enhanced strength of the rotary tool 1. Specifically, the amount of cutting can be increased if the helix angle is large. The strength of the rotary tool 1 can be enhanced if the helix angle is small. If the first helix angle $\theta 2a$ is different from the second helix angle $\theta 2b$, the first angle $\theta 1$ may be smaller than each of the first helix angle $\theta 2a$ and the second helix angle $\theta 2b$.

The first helix angle $\theta 2a$ may be larger than the second helix angle $\theta 2b$ as in the non-limiting embodiment illustrated in FIGS. 9 and 11. If satisfying this configuration, it is may be possible to facilitate the flow of chips in the vicinity of the first cutting edge 13 to the side of the second end 3b.

Although the first helix angle $\theta 2a$ may be larger than the second helix angle $\theta 2b$, it is not intended to limit thereto. For example, the first helix angle $\theta 2a$ may be smaller than or equal to the second helix angle $\theta 2b$.

The first opening 23 may be located in the vicinity of a boundary 29 between the first portion 25 and the second portion 27 in the non-limiting embodiment illustrated in FIG. 5. If satisfying this configuration, chip clogging may be less likely to occur at the boundary 29 where a chip flow may change. As used herein, the phrase that "the first opening 23 is located in the vicinity of the boundary 29" may be a concept including not only a state where the first opening 23 is strictly located on the boundary 29, but also a state where the first opening 23 is located in surroundings of the boundary 29 as long as the above effect is obtainable. For example, the first opening 23 may be located at a position shifted slightly from the boundary 29 to the side of the first end 3a in the first flute 15.

The flow path 9 may further include other sub flow path in addition to the first sub flow path 21. One or a plurality of other sub flow paths may be included. For example, the flow path 9 may further include a second sub flow path 31 which is located closer to the side of the second end 3b than the first sub flow path 21, and which is extended from the main flow path 19 to the side of the second end 3b as in the non-limiting embodiment illustrated in FIG. 1. The second sub flow path 31 may include a second opening 33 that opens into the first flute 15 in the non-limiting embodiment illustrated in FIG. 4. If satisfying these configurations, enhanced chip discharge performance may be attainable because the fluid can be discharged from the second opening 33 of the second sub flow path 31 in addition to the first opening 23 of the first sub flow path 21 toward the side of the second end 3b.

The second sub flow path 31 may have a straight line shape and may be extended from the first main flow path 19a toward the side of the second end 3b in the non-limiting embodiment illustrated in FIG. 4. The second sub flow path 31 may be extended from the second main flow path 19b toward the side of the second end 3b.

Figure 10:
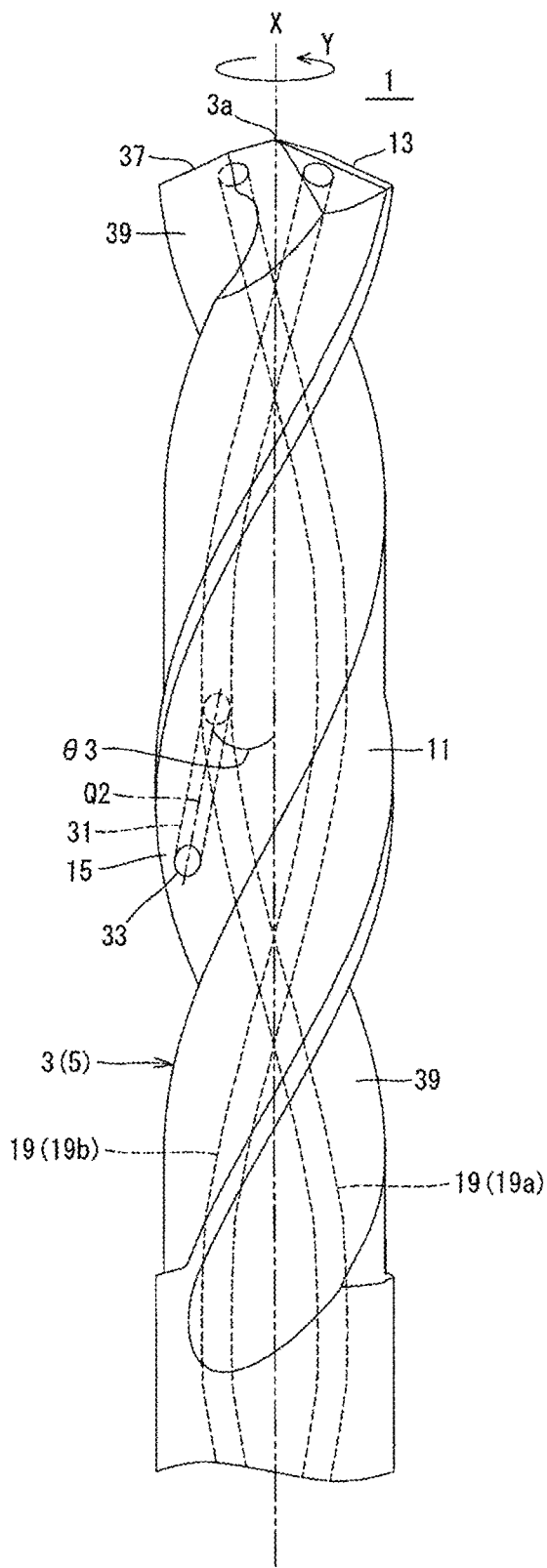
FIG. 10 is an enlarged view of surroundings of the first end of the rotary tool illustrated in FIG. 4.

A second angle θ3 formed by the rotation axis X and the second flow path 31 may be different from the first angle θ1 as in a non-limiting embodiment illustrated in FIG. 10. If satisfying this configuration, it may be easy to individually control the fluid in the first sub flow path 21 and the second sub flow path 31. The rotary tool 1 may therefore have good chip discharge performance.

Specifically, a route of the first sub flow path 21 may tend to become shorter with increasing the first angle θ1. A route of the second sub flow path 31 may tend to become smaller with increasing the second angle θ3. A path loss may become shorter with decreasing the route of the first sub flow path 21 or the second sub flow path 31. Accordingly, a large amount of the fluid may flow out from the first sub flow path 21 or the second sub flow path 31. This may lead to a large force to push out the chips by the fluid flowing out from the first sub flow path 21 or the second sub flow path 31.

Meanwhile, the fluid flowing out from the first sub flow path 21 may tend to flow toward the second end 3b with decreasing the first angle θ1. The fluid flowing out from the second sub flow path 31 may tend to flow toward the second end 3b with decreasing the second angle θ3. Consequently, the chips washed away by the fluid may tend to be stably discharged toward the second end 3b.

A fluid control suitable for each of the first sub flow path 21 and the second sub flow path 31 can be carried out by suitably adjusting magnitude of the first angle θ1 and the second angle θ3. The second angle θ3 may be smaller than the helix angle θ2 as in the non-limiting embodiment illustrated in FIG. 10.

The second angle θ3 may be larger than the first angle θ1 as in the non-limiting embodiment illustrated in FIGS. 8 and 10. If satisfying this configuration, a chip discharge direction can be stabilized by the fluid flowing out from the first sub flow path 21 located closer to the side of the first end 3a than the second sub flow path 31. Additionally, a chip discharge speed can be increased by the fluid flowing out from the second sub flow path 31 located closer to the side of the second end 3b than the first sub flow path 21.

Figure 13:
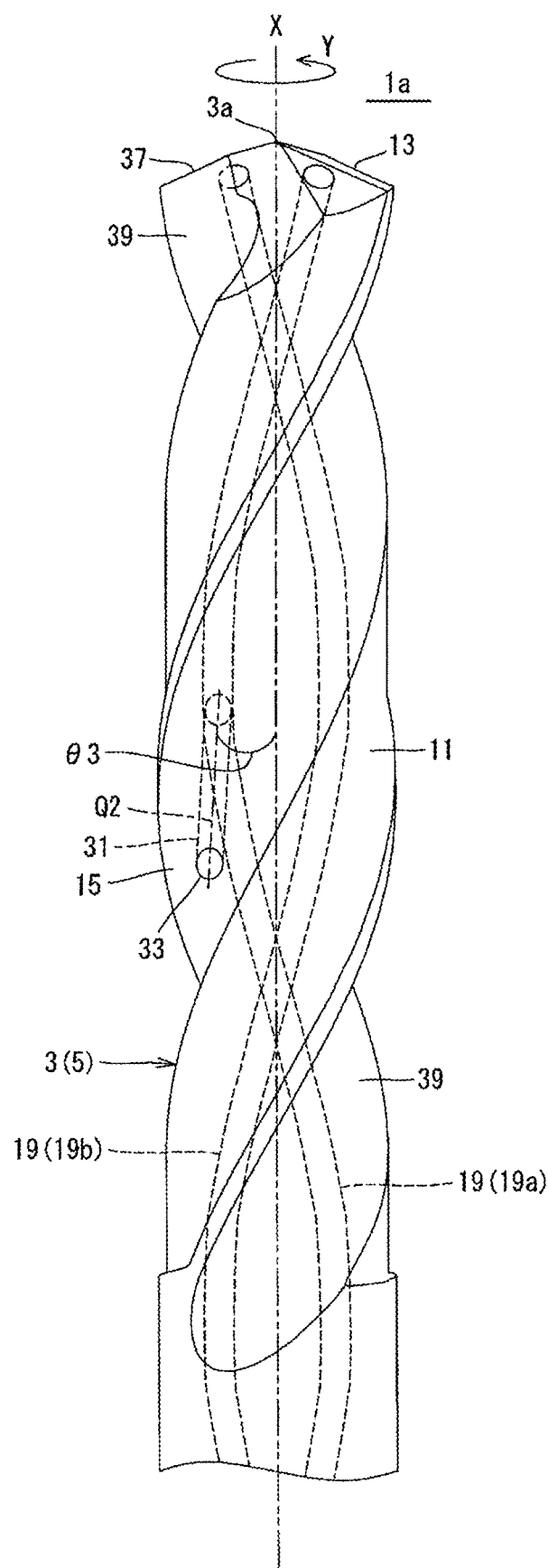
FIG. 13 is a diagram illustrating a rotary tool in a non-limiting embodiment of the present disclosure.

A relationship between the first angle θ1 and the second angle θ3 is not limited to a relationship that the second angle θ3 is larger than the first angle θ1. For example, the second angle θ3 may be smaller than the first angle θ1 as in a rotary tool 1a in a non-limiting embodiment illustrated in FIG. 13. If satisfying this configuration, a chip discharge speed can be increased by the fluid flowing out from the first sub flow path 21 located closer to the side of the first end 3a than the second sub flow path 31. Additionally, the chips may tend to be stably discharged toward the second end 3b by the fluid flowing out from the second sub flow path 31 located closer to the side of the second end 3b than the first sub flow path 21. FIG. 13 may be a diagram corresponding to the enlarged view illustrated in FIG. 10.

The second angle θ3 may be evaluated in the same manner as in the first angle θ1. That is, the second angle θ3 may be evaluated in a state where an angle formed by the rotation axis X and a central axis Q2 of the second sub flow path 31 may become maximum if the cutting part 5 is viewed from the direction orthogonal to the rotation axis X, as in the non-limiting embodiment illustrated in FIG. 10. The second angle θ3 may be settable to, for example, −20 to 25 degrees.

A relationship between the first angle θ1 and the second angle θ3 is not limited to a relationship that the second angle θ3 is larger or smaller than the first angle θ1. For example, the second angle θ3 may be equal to the first angle θ1.

A first inner diameter of the first sub flow path 21 may be different from a second inner diameter of the second sub flow path 31 as in the non-limiting embodiment illustrated in FIGS. 8 and 10. If satisfying this configuration, it may be possible to adjust an injection pressure of the fluid ejected from the first opening 23 and the second opening 33.

The second inner diameter may be larger than the first inner diameter as in the non-limiting embodiment illustrated in FIGS. 8 and 10. If satisfying this configuration, a volume of the fluid ejected from the second inner diameter can be increased to enhance chip discharge performance in the vicinity of the second inner diameter.

That is, it may be possible to rephrase that the first inner diameter is smaller than the second inner diameter. If satisfying this configuration, a speed of the fluid ejected from the first inner diameter can be increased.

The first inner diameter may be settable to, for example, 0.3-0.9 mm. The second inner diameter may be settable to, for example, 0.3-1.5 mm. A relationship between the first inner diameter and the second inner diameter is not limited to a relationship that the second inner diameter is larger than the first inner diameter. For example, the second inner diameter may be smaller than or equal to the first inner diameter.

Figure 7:
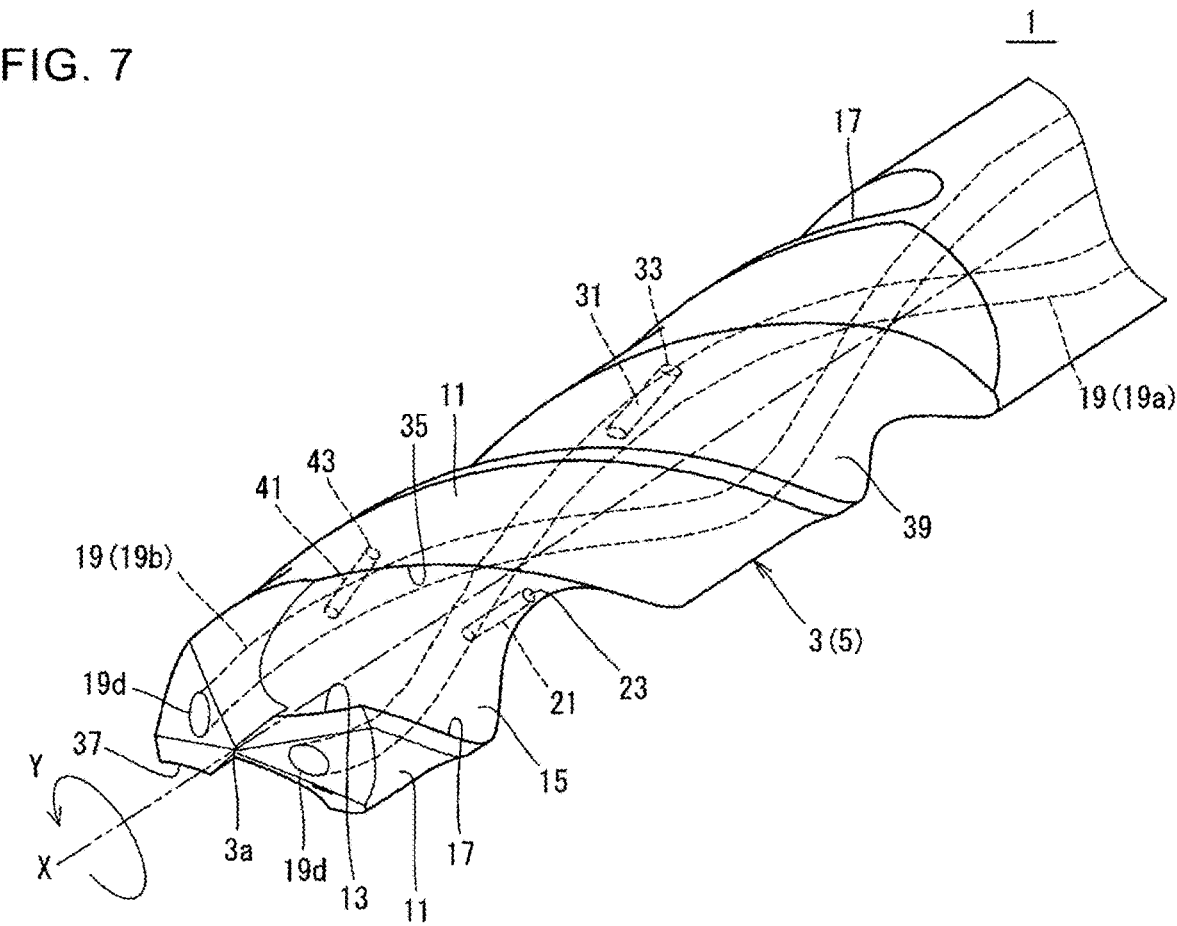
FIG. 7 is an enlarged view of surroundings of a first end of the rotary tool illustrated in FIG. 1.

The cutting part 5 may further include a second ridgeline 35 as in a non-limiting embodiment illustrated in FIG. 7. The second ridgeline 35 may be a ridgeline formed by the first flute 15 and the outer peripheral surface 11 adjacent to the first flute 15 on a front side in the rotation direction Y in the non-limiting embodiment illustrated in FIG. 7. The first opening 23 may be located closer to the first ridgeline 17 than the second ridgeline 35 as in the non-limiting embodiment illustrated in FIG. 8. If satisfying these configurations, the fluid ejected from the first opening 23 may be ejected along the first ridgeline 17 in the first flute 15, so that chips generated from the first ridgeline 17 can be discharged suitably.

The cutting part 5 may further include other cutting edge in addition to the first cutting edge 13. The cutting part 5 may also include other flute in addition to the first flute 15. One or more other cutting edges and other flutes may be included. For example, the cutting part 5 may further include a second cutting edge 37 and a second flute 39 as in the non-limiting embodiment illustrated in FIG. 7. The second cutting edge 37 may be located from the first end 3a toward the outer peripheral surface 11, and the second flute 39 may be spirally extended from the second cutting edge 37 toward the second end 3b in the non-limiting embodiment illustrated in FIG. 7.

A configuration of the second cutting edge 37 may be identical with or different from a configuration of the first cutting edge 13. Similarly, a configuration of the second flute 39 may be identical with or different from a configuration of the first flute 15. The configuration of the second cutting edge 37 may be identical with the configuration of the first cutting edge 13, and the configuration of the second flute 39 is identical with the configuration of the first flute 15 in the non-limiting embodiment illustrated in FIG. 7. The second cutting edge 37 may be located so as to have 180-degree rotational symmetry with respect to the first cutting edge 13 on the basis of the rotation axis X1 in a front view from the side of the first end 3a.

The flow path 9 may further include a third sub flow path 41 as in the non-limiting embodiment illustrated in FIG. 1. The third sub flow path 41 may be extended from the main flow path 19 toward the side of the second end 3b in the non-limiting embodiment illustrated in FIG. 6. The third sub flow path 41 may include a third opening 43 that opens into the second flute 39. If satisfying these configurations, the fluid can be discharged toward the side of the second end 3b from the third opening 43 of the third sub flow path 41 in addition to the first opening 23 of the first sub flow path 21, thus leading to enhanced chip discharge performance.

The third sub flow path 41 may have a straight line shape and may be extended from the second main flow path 19b toward the side of the second end 3b as in the non-limiting embodiment illustrated in FIG. 6. Alternatively, the third sub flow path 41 may be extended from the first main flow path 19a toward the side of the second end 3b.

The first opening 23 and the third opening 43 may be located at different positions in the direction along the rotation axis X as in the non-limiting embodiment illustrated in FIG. 6. If satisfying this configuration, stress applied to the first sub flow path 21 and the third sub flow path 41 and stress applied to the first opening 23 and the third opening 43 may tend to be dispersed in the direction along the rotation axis X. It may therefore be possible to reduce deterioration of the strength of the rotary tool 1, so that the rotary tool 1 may be less likely to be fractured.

The relationship between the first opening 23 and the third opening 43 in the direction along the rotation axis X is not limited to the relationship that these two openings are located at the different positions. For example, the first opening 23 and the third opening 43 may be located at the same position in the direction along the rotation axis X.

Figure 12:
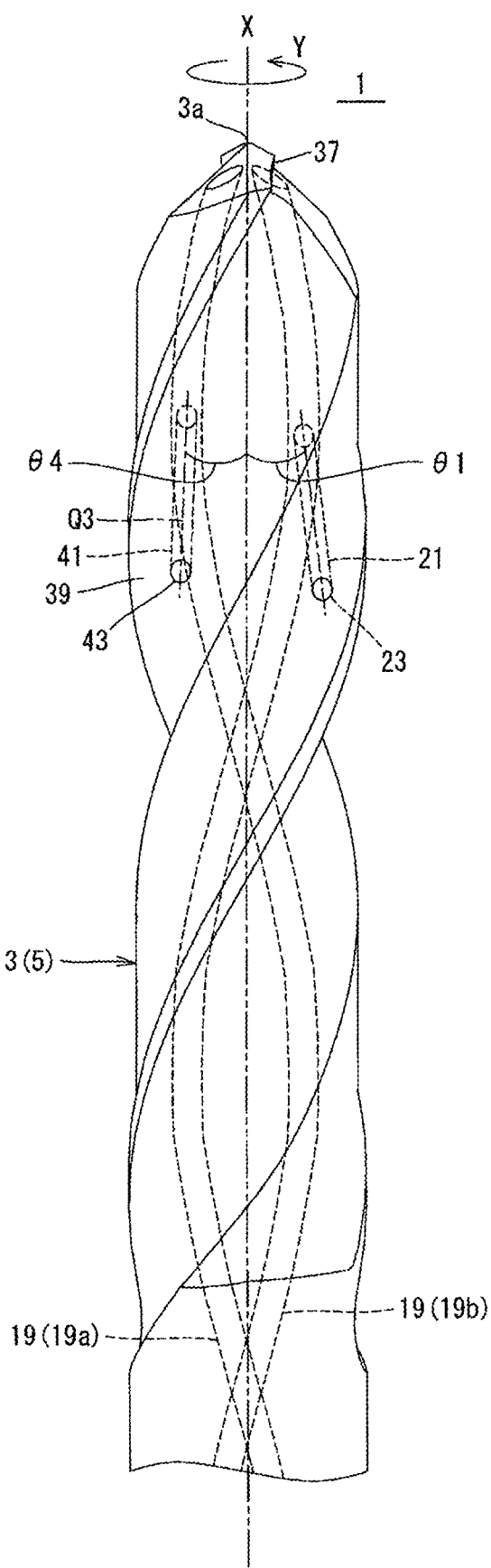
FIG. 12 is an enlarged view of surroundings of the first end of the rotary tool illustrated in FIG. 6.

In a non-limiting embodiment illustrated in FIG. 12, a third angle θ4 formed by the rotation axis X and the third sub flow path 41 may be evaluated in the same manner as in the first angle θ1. That is, the third angle θ4 may be evaluated in a state where an angle formed by the rotation axis X and a central axis Q3 of the third sub flow path 41 may become maximum if the cutting part 5 is viewed from the direction orthogonal to the rotation axis X, as in the non-limiting embodiment illustrated in FIG. 12. The third angle θ4 may be settable to, for example, −20 to 25 degrees.

The third angle θ4 may be smaller than the helix angle of the second flute 39 as in the non-limiting embodiment illustrated in FIG. 12. Specifically, in the non-limiting embodiment illustrated in FIG. 12, the third angle θ4 may be smaller than a helix angle formed by the rotation axis X and a third ridgeline in which the third ridgeline is a ridgeline formed by the second flute 39 and the outer peripheral surface 11 adjacent to the second flute 39 on a rear side in the rotation direction Y of the rotation axis X. The third ridgeline may correspond to the first ridgeline 17 in the non-limiting embodiment illustrated in FIG. 12.

As in the non-limiting embodiment illustrated in FIG. 12, if the third opening 43 is located closer to the side of the first end 3a than the first opening 23 in the direction along the rotation axis X, in other words, if the third opening 43, the first opening 23 and the second opening 33 may be located in this order from the side of the first end 3a toward a side of the second end 3b in the direction along the rotation axis X, the first angle θ1, the second angle θ3 and the third angle θ4 may have a relationship that the second angle θ3>the first angle θ1>the third angle θ4.

Figure 14:
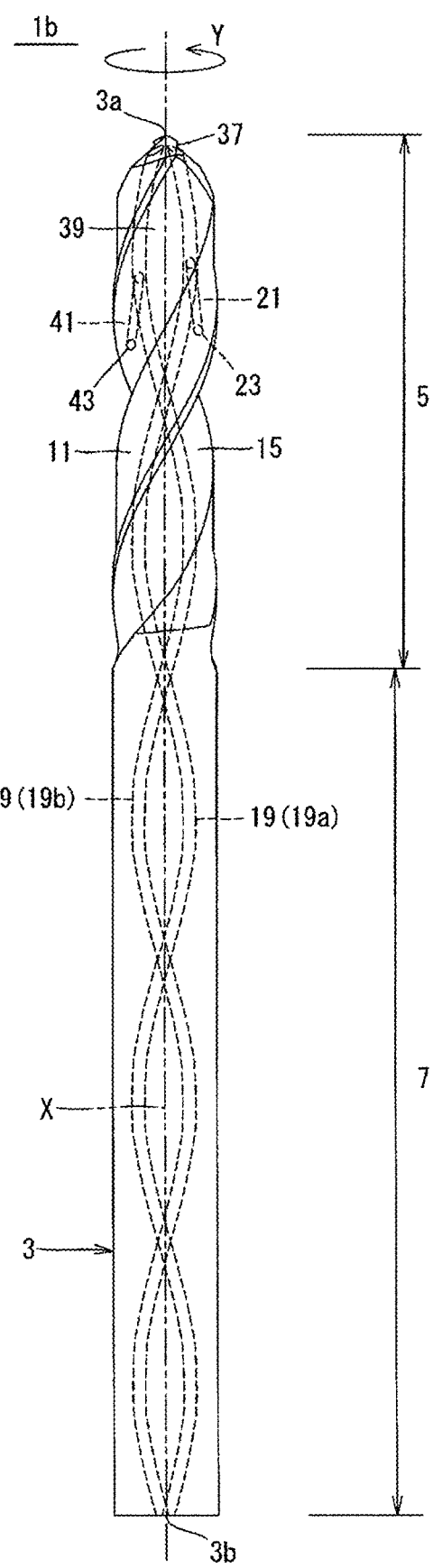
FIG. 14 is a diagram illustrating a rotary tool in a non-limiting embodiment of the present disclosure.

As in a rotary tool 1b in a non-limiting embodiment illustrated in FIG. 14, if the first opening 23 is located closer to the first end 3a than the third opening 43 in the direction along the rotation axis X, in other words, if the first opening 23, the third opening 43 and the second opening 33 are located in this order from the side of the first end 3a toward the side of the second end 3b in the direction along the rotation axis X, the first angle θ1, the second angle θ3 and the third angle θ4 may have a relationship that the second angle θ3>the third angle θ4>the first angle θ1. FIG. 14 may be a diagram corresponding to the side view illustrated in FIG. 6.

The second angle θ3 may be smaller than the first angle θ1 as described above. In this case, the first angle θ1, the second angle θ3 and the third angle θ4 may have the following relationship. That is, if the third opening 43, the first opening 23 and the second opening 33 are located in this order from the side of the first end 3a toward the side of the second end 3b in the direction along the rotation axis X, the first angle θ1, the second angle θ3 and the third angle θ4 may have a relationship that the third angle θ4>the first angle θ1>the second angle θ3. Still alternatively, if the first opening 23, the third opening 43 and the second opening 33 are located in this order from the side of the first end 3a toward the side of the second end 3b in the direction along the rotation axis X, the first angle θ1, the second angle θ3 and the third angle θ4 may have a relationship that the first angle θ1>the third angle θ4>the second angle θ3.

A first inner diameter of the first sub flow path 21 may be smaller than an inner diameter of the main flow path 19 as in the non-limiting embodiment illustrated in FIG. 7. If satisfying this configuration, a fluid pressure of the fluid ejected from the first opening 23 may tend to become higher. For the same reason, a second inner diameter of the second sub flow path 31 may be smaller than the inner diameter of the main flow path 19, and a third inner diameter of the third sub flow path 41 may be smaller than the inner diameter of the main flow path 19 as in the non-limiting embodiment illustrated in FIG. 7. The third inner diameter of the third sub flow path 41 may be settable to, for example, 0.3-2 mm.

For example, cemented carbide and cermet may be usable as a material of the base 3. Examples of composition of the cemented carbide may include WC—Co, WC—TiC—Co and WC—TiC—TaC—Co, in which WC, TiC and TaC may be hard particles, and Co may be a binding phase. The cermet may be a sintered composite material obtainable by compositing metal into a ceramic component. Examples of the cermet may include titanium compounds composed mainly of titanium carbide (TiC) or titanium nitride (TiN).

A surface of the base 3 may be coated with a coating film by using chemical vapor deposition (CVD) method or physical vapor deposition (PVD) method. Examples of composition of the coating film may include titanium carbide (TiC), titanium nitride (TiN), titanium carbonitride (TiCN) and alumina ($Al_2O_3$).

<Method for Manufacturing Machined Product>

A method for manufacturing a machined product in a non-limiting embodiment of the present disclosure may be described in detail below with reference to FIGS. 15 to 17 by exemplifying the case of using the above rotary tool 1.

The method for manufacturing the machined product in the non-limiting embodiment may include the following steps:

(1) rotating the rotary tool 1 around the rotation axis X;
(2) bringing the first cutting edge 13 in the rotary tool 1 being rotated into contact with a workpiece 100; and
(3) moving the rotary tool 1 away from the workpiece 100.

Figure 15:
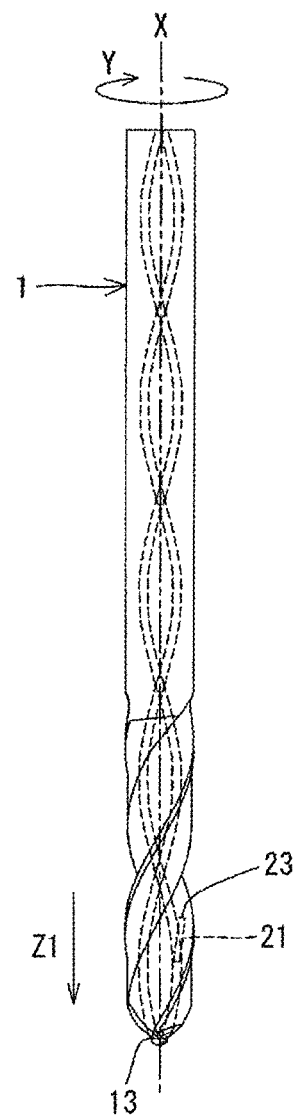
FIG. 15 is a schematic diagram illustrating one of steps in a method for manufacturing a machined product in a non-limiting embodiment of the present disclosure.
Figure 15:
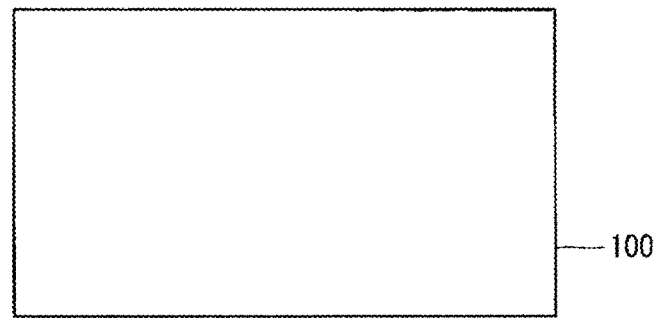

More specifically, firstly, as in the non-limiting embodiment illustrated in FIG. 15, the rotary tool 1 may be relatively brought near the workpiece 100 by moving the rotary tool 1 in a direction Z1 along the rotation axis X while rotating the rotary tool 1 around the rotation axis X.

Subsequently, as in the non-limiting embodiment illustrated in FIG. 16, the workpiece 100 may be cut out by bringing the first cutting edge 13 of the rotary tool 1 into contact with the workpiece 100. In this case, the workpiece 100 may be cut out while allowing a fluid to flow out from the first opening 23.

Figure 17:
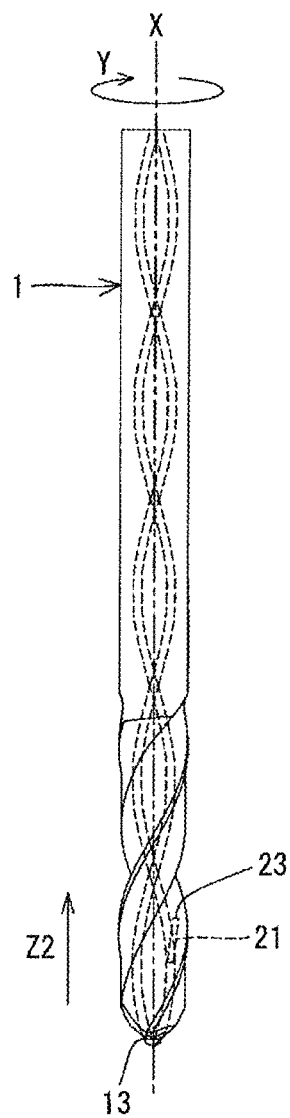
FIG. 17 is a schematic diagram illustrating one of the steps in the method for manufacturing a machined product in the non-limiting embodiment of the present disclosure.
Figure 17:
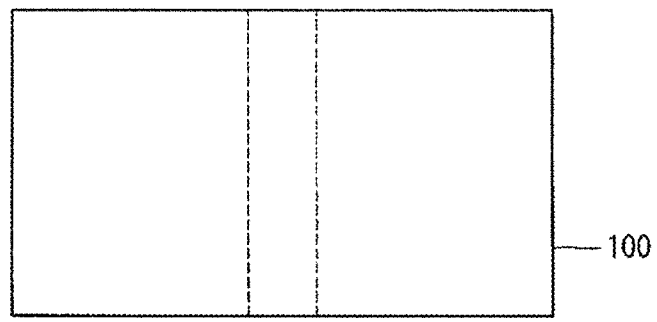

Thereafter, as in the non-limiting embodiment illustrated in FIG. 17, the machined product may be obtained by moving the rotary tool 1 in a direction Z2 so that the rotary tool 1 may relatively be moved away from the workpiece 100.

With the method for manufacturing the machined product in the non-limiting embodiment, the machined product having highly precise machined surface may be obtainable using the rotary tool 1 having excellent chip discharge performance.

In the non-limiting embodiment illustrated in FIG. 15, the rotary tool 1 may be brought near the workpiece 100 in a state where the workpiece 100 is fixed and the rotary tool 1 is rotated around the rotation axis X. In the non-limiting embodiment illustrated in FIG. 16, the workpiece 100 may be cut out by bringing the first cutting edge 13 of the rotary tool 1 being rotated into contact with the workpiece 100. The rotary tool 1 being rotated may be moved away from the workpiece 100 as in the non-limiting embodiment illustrated in FIG. 17.

Figure 16:
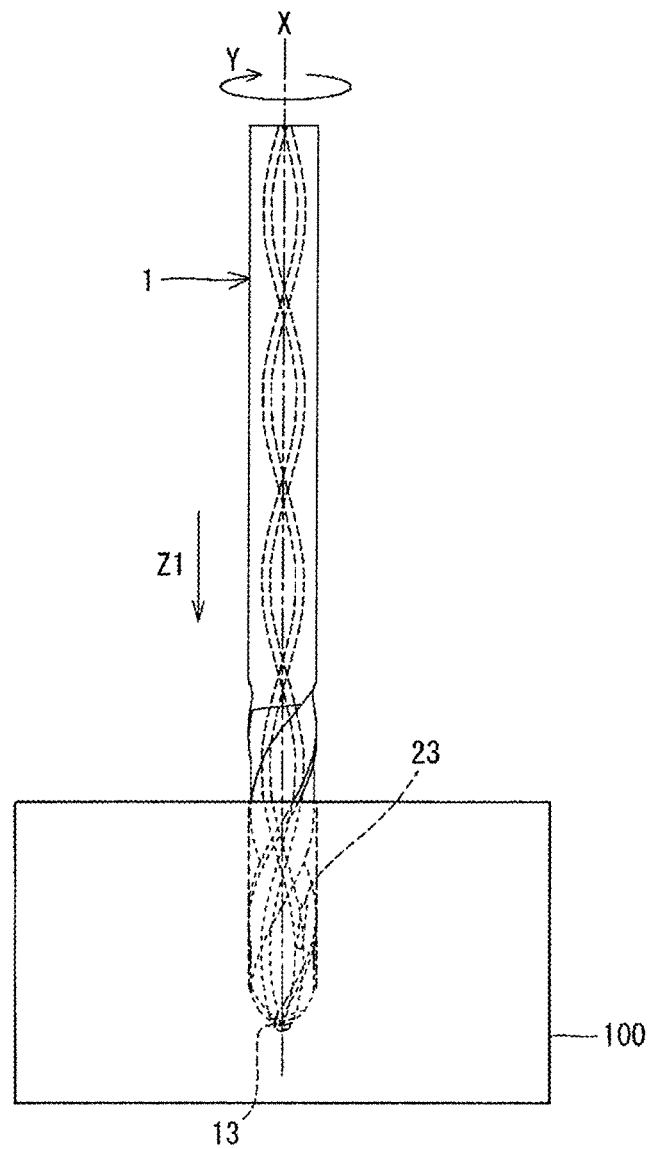
FIG. 16 is a schematic diagram illustrating one of the steps in the method for manufacturing a machined product in the non-limiting embodiment of the present disclosure.

Although the machined product is obtained by moving the rotary tool 1 in the non-limiting embodiment illustrated in FIGS. 15 to 17, it is not intended to limit thereto. For example, the workpiece 100 may be brought near the rotary tool 1 in the step (1). Similarly, the workpiece 100 may be moved away from the rotary tool 1 in the step (3). If it is desired to continue the cutting process, the step of bringing the cutting edge 13 of the rotary tool 1 into contact with different portions of the workpiece 100 may be repeated while keeping the rotary tool 1 rotated.

Examples of material of the workpiece 100 may include aluminum, carbon steel, alloy steel, stainless steel, cast iron and nonferrous metals.

While the rotary tools 1 and the methods for manufacturing a machined product in the non-limiting embodiments of the present disclosure have been exemplified above, the present disclosure is not limited to the above embodiments. It may be, of course, possible to make any arbitrary ones in so far as they do not depart from the gist of the present disclosure.

The invention claimed is:

1. A rotary tool, comprising:
    a base which has a bar shape and is extended along a rotation axis from a first end toward a second end, wherein
    the base comprises
        a cutting part including the first end,
        a shank part located closer to the second end than the cutting part, and
        a flow path which is located inside the base and is extended along the rotation axis,
    the cutting part comprises
        an outer peripheral surface,
        a first cutting edge extended from the first end toward the outer peripheral surface,
        a first flute spirally extended from the first cutting edge toward the second end, and
        a first ridgeline formed by the first flute and the outer peripheral surface adjacent to the first flute on a rear side in a rotation direction of the rotation axis,
    the flow path comprises
        a main flow path extended from a side of the second end toward the first end, and
        a first sub flow path extended from the main flow path toward the second end,
    the first sub flow path comprises a first opening that opens into the first flute,
    a first angle formed by the rotation axis and the first sub flow path is smaller than a helix angle formed by the rotation axis and the first ridgeline,
    the first ridgeline comprises
        a first portion, and
        a second portion located closer to the second end than the first portion, and
    a first helix angle formed by the rotation axis and the first portion is different from a second helix angle formed by the rotation axis and the second portion.

2. The rotary tool according to claim 1, wherein the first opening is located closer to the first end than a center of the cutting part in a direction along the rotation axis.

3. The rotary tool according to claim 1, wherein the first helix angle is larger than the second helix angle.

4. The rotary tool according to claim 1, wherein the first opening is located in the vicinity of a boundary between the first portion and the second portion.

5. The rotary tool according to claim 1, wherein
    the flow path further comprises a second sub flow path which is located closer to a side of the second end than the first sub flow path, and is extended from the main flow path toward the side of the second end,
    the second sub flow path comprises a second opening that opens into the first flute, and
    a second angle formed by the rotation axis and the second sub flow path is different from the first angle.

6. The rotary tool according to claim 5, wherein the second angle is smaller than the first angle.

7. The rotary tool according to claim 1, wherein
    the flow path further comprises a second sub flow path which is located closer to the second end than the first sub flow path, and is extended from the main flow path toward the second end,
    the second sub flow path comprises a second opening that opens into the first flute, and a first inner diameter of the first sub flow path is different from a second inner diameter of the second sub flow path.

8. The rotary tool according to claim 7, wherein the second inner diameter is larger than the first inner diameter.

9. The rotary tool according to claim 1, wherein
the cutting part further comprises a second ridgeline formed by the first flute and the outer peripheral surface adjacent to the first flute on a front side in the rotation direction, and
the first opening is located closer to the first ridgeline than the second ridgeline.

10. The rotary tool according to claim 1, wherein
the cutting part further comprises
a second cutting edge extended from the first end toward the outer peripheral surface, and
a second flute spirally extended from the second cutting edge toward the second end,
the flow path further comprises a third sub flow path extended from the main flow path toward the second end,
the third sub flow path comprises a third opening that opens into the second flute, and
the first opening and the third opening are located at different positions in a direction along the rotation axis.

11. A method for manufacturing a machined product, the method comprising:
rotating the rotary tool according to claim 1;
bringing the rotary tool being rotated into contact with a workpiece; and
moving the rotary tool away from the workpiece.

12. A rotary tool, comprising:
a base which has a bar shape and is extended along a rotation axis from a first end toward a second end, wherein
the base comprises
a cutting part including the first end,
a shank part located closer to the second end than the cutting part, and
a flow path which is located inside the base and is extended along the rotation axis,
the cutting part comprises
an outer peripheral surface,
a first cutting edge extended from the first end toward the outer peripheral surface,
a first flute spirally extended from the first cutting edge toward the second end, and
a first ridgeline formed by the first flute and the outer peripheral surface adjacent to the first flute on a rear side in a rotation direction of the rotation axis,
the flow path comprises
a main flow path extended from a side of the second end toward the first end, and
a first sub flow path extended from the main flow path toward the second end,
the first sub flow path comprises a first opening that opens into the first flute,
a first angle formed by the rotation axis and the first sub flow path is smaller than a helix angle formed by the rotation axis and the first ridgeline,
the flow path further comprises a second sub flow path which is located closer to a side of the second end than the first sub flow path, and is extended from the main flow path toward the side of the second end,
the second sub flow path comprises a second opening that opens into the first flute, and
a second angle formed by the rotation axis and the second sub flow path is smaller than the first angle.

13. A rotary tool, comprising:
a base which has a bar shape and is extended along a rotation axis from a first end toward a second end, wherein
the base comprises
a cutting part including the first end,
a shank part located closer to the second end than the cutting part, and
a flow path which is located inside the base and is extended along the rotation axis,
the cutting part comprises
an outer peripheral surface,
a first cutting edge extended from the first end toward the outer peripheral surface,
a first flute spirally extended from the first cutting edge toward the second end, and
a first ridgeline formed by the first flute and the outer peripheral surface adjacent to the first flute on a rear side in a rotation direction of the rotation axis,
the flow path comprises
a main flow path extended from a side of the second end toward the first end, and
a first sub flow path extended from the main flow path toward the second end,
the first sub flow path comprises a first opening that opens into the first flute,
a first angle formed by the rotation axis and the first sub flow path is smaller than a helix angle formed by the rotation axis and the first ridgeline,
the first angle is greater than 0 degrees and less than 25 degrees,
the flow path further comprises a second sub flow path which is located further from the first end than the first sub flow path, the first end including a tip, and
a second inner diameter of the second sub flow path is greater than a first inner diameter of the first sub flow path.

* * * * *